(12) United States Patent
Gold

(10) Patent No.: US 10,962,507 B2
(45) Date of Patent: Mar. 30, 2021

(54) SYSTEM AND METHOD FOR CALIBRATING AN ACOUSTIC MONITORING SYSTEM OF AN ADDITIVE MANUFACTURING MACHINE

(71) Applicant: General Electric Company, Schenectady, NY (US)

(72) Inventor: Scott Alan Gold, Waynesville, OH (US)

(73) Assignee: General Electric Company, Schenectady, NY (US)

( * ) Notice: Subject to any disclaimer, the term of this patent is extended or adjusted under 35 U.S.C. 154(b) by 205 days.

(21) Appl. No.: 16/202,539

(22) Filed: Nov. 28, 2018

(65) Prior Publication Data

US 2020/0166482 A1 May 28, 2020

(51) Int. Cl.
| | |
|---|---|
| *G01N 29/30* | (2006.01) |
| *B22F 3/10* | (2006.01) |
| *B22F 7/00* | (2006.01) |
| *B33Y 30/00* | (2015.01) |
| *B33Y 50/00* | (2015.01) |
| *G01N 29/22* | (2006.01) |
| *B22F 3/105* | (2006.01) |

(52) U.S. Cl.
CPC ............. *G01N 29/30* (2013.01); *B33Y 50/00* (2014.12); *G01N 29/223* (2013.01); *B22F 3/1055* (2013.01); *B22F 2003/1057* (2013.01)

(58) Field of Classification Search
CPC .......................... B22F 3/00–26; B22F 3/1055; B22F 7/00–08; B22F 2003/1057; B33Y 30/00; B33Y 50/00; G01N 29/00–52
See application file for complete search history.

(56) References Cited

U.S. PATENT DOCUMENTS

| | | | |
|---|---|---|---|
| 4,286,868 | A | 9/1981 | Laska |
| 5,123,734 | A | 6/1992 | Spence et al. |
| 6,553,275 | B1 | 4/2003 | Mazumder |
| 6,580,959 | B1 | 6/2003 | Mazumder |
| 7,623,230 | B2 | 11/2009 | Porjo |

(Continued)

FOREIGN PATENT DOCUMENTS

| | | |
|---|---|---|
| EP | 3128321 A1 | 2/2017 |
| EP | 3170592 A1 | 5/2017 |
| WO | 2016062897 A1 | 4/2016 |

OTHER PUBLICATIONS

European Extended Search Report for application EP 19204618.3 dated Feb. 3, 2020 (12 pages).

*Primary Examiner* — Nguyen Q. Ha

(74) *Attorney, Agent, or Firm* — Dinsmore & Shohl LLP

(57) ABSTRACT

A system and method for calibrating an acoustic monitoring system of an additive manufacturing machine includes installing a calibration system on the machine and performing a calibration process. Specifically, the calibration system includes a calibration platform removably mountable to a build platform of the additive manufacturing machine and having calibrated acoustic source mounted thereon for defining a measurement standard. The acoustic waves generated by the calibrated acoustic source are measured by the acoustic monitoring system and compared to the known measurement standard to determine whether system adjustments would improve process tolerances or uniformity.

18 Claims, 4 Drawing Sheets

(56) References Cited

U.S. PATENT DOCUMENTS

| | | |
|---|---|---|
| 8,351,035 B2 | 1/2013 | Goohs et al. |
| 9,174,300 B2 | 11/2015 | Stecker et al. |
| 9,555,475 B2 | 1/2017 | Sidhu et al. |
| 9,696,142 B2 | 7/2017 | Bamberg et al. |
| 9,702,248 B2 | 7/2017 | Chen et al. |
| 9,999,924 B2 | 6/2018 | Dave et al. |
| 2009/0178466 A1* | 7/2009 | Ethridge .............. G01N 29/262 73/1.86 |
| 2010/0126275 A1* | 5/2010 | Leyh .................... G01N 29/346 73/579 |
| 2013/0168902 A1 | 7/2013 | Herzog et al. |
| 2015/0059886 A1* | 3/2015 | Anderson .............. G01N 29/02 137/551 |
| 2016/0185048 A1 | 6/2016 | Dave et al. |
| 2016/0303806 A1 | 10/2016 | Mercelis |
| 2017/0090462 A1 | 3/2017 | Dave et al. |
| 2017/0199162 A1* | 7/2017 | Nordstrom ............. G01N 29/30 |
| 2017/0203517 A1 | 7/2017 | Crear et al. |
| 2017/0246810 A1 | 8/2017 | Gold |
| 2017/0355146 A1 | 12/2017 | Buller et al. |
| 2018/0154442 A1 | 6/2018 | Milshtein et al. |
| 2018/0154484 A1* | 6/2018 | Hall ...................... B22F 3/1055 |

\* cited by examiner

SYSTEM AND METHOD FOR CALIBRATING AN ACOUSTIC MONITORING SYSTEM OF AN ADDITIVE MANUFACTURING MACHINE

FIELD

The present disclosure generally relates to additive manufacturing machines, or more particularly, to a calibration system for an additive manufacturing machine.

BACKGROUND

Additive manufacturing (AM) processes generally involve the buildup of one or more materials to make a net or near net shape (NNS) object, in contrast to subtractive manufacturing methods. Though "additive manufacturing" is an industry standard term (ISO/ASTM52900), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model.

A particular type of AM process uses an energy source such as an irradiation emission directing device that directs an energy beam, for example, an electron beam or a laser beam, to sinter or melt a powder material, creating a solid three-dimensional object in which particles of the powder material are bonded together. AM processes may use different material systems or additive powders, such as engineering plastics, thermoplastic elastomers, metals, and/or ceramics. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass, and momentum transfer, and chemical reactions that make the process very complex.

During direct metal laser sintering (DMLS) or direct metal laser melting (DMLM), an apparatus builds objects in a layer-by-layer manner by sintering or melting a powder material using an energy beam. The powder to be melted by the energy beam is spread evenly over a powder bed on a build platform, and the energy beam sinters or melts a cross sectional layer of the object being built under control of an irradiation emission directing device. The build platform is lowered and another layer of powder is spread over the powder bed and object being built, followed by successive melting/sintering of the powder. The process is repeated until the part is completely built up from the melted/sintered powder material.

After fabrication of the part is complete, various post-processing procedures may be applied to the part. Post processing procedures include removal of excess powder by, for example, blowing or vacuuming. Other post processing procedures include a stress relief process. Additionally, thermal, mechanical, and chemical post processing procedures can be used to finish the part.

In order to monitor the additive manufacturing process, certain conventional additive manufacturing machines include acoustic monitoring systems. These monitoring systems typically include one or more microphones or acoustic wave sensors for detecting acoustic waves or vibrations generated or otherwise emitted during the process. The measured acoustic waves or sensor values can be used to evaluate the quality of the build, during or after completion of the build process. The quality evaluation may be used to adjust the build process, stop the build process, troubleshoot build process anomalies, issue a warning to the machine operator, and/or identify suspect or poor quality parts resulting from the build. However, such acoustic monitoring systems are frequently not calibrated, making it impossible to determine if variations in measured acoustic signals are a product of variations in the additive build process or melt pool or are the product of variations in the acoustic monitoring system itself when comparing data from multiple machines. In practice, additive manufacturing has been primarily used for prototyping and small lot production with acoustic monitoring used as a research and development tool rather than part quality assessment. The recent emergence of mass production applications where build-to-build and machine-to-machine repeatability is far more critical has highlighted the value of acoustic monitoring as a quality tool.

Accordingly, an additive manufacturing machine with improved calibration features would be useful. More particularly, a system and method for calibrating an acoustic monitoring system of an additive manufacturing machine would be particularly beneficial.

BRIEF DESCRIPTION

Aspects and advantages will be set forth in part in the following description, or may be obvious from the description, or may be learned through practice of the invention.

According to one embodiment of the present subject matter, a method of calibrating an acoustic monitoring system of an additive manufacturing machine is provided. The method includes generating acoustic waves from one or more calibrated acoustic sources from one or more fixed positions in the additive manufacturing machine and measuring an acoustic signal of the generated acoustic waves using the acoustic monitoring system. The method further includes comparing the measured acoustic signal to a measurement standard for use in calibrating the acoustic monitoring system.

According to another exemplary embodiment, a calibration system for an acoustic monitoring system of an additive manufacturing machine is provided. The calibration system includes a mounting mechanism positionable at desired locations within the additive manufacturing machine and one or more calibrated acoustic sources mounted to the mounting mechanism, the one or more calibrated acoustic sources defining a measurement standard when operating.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
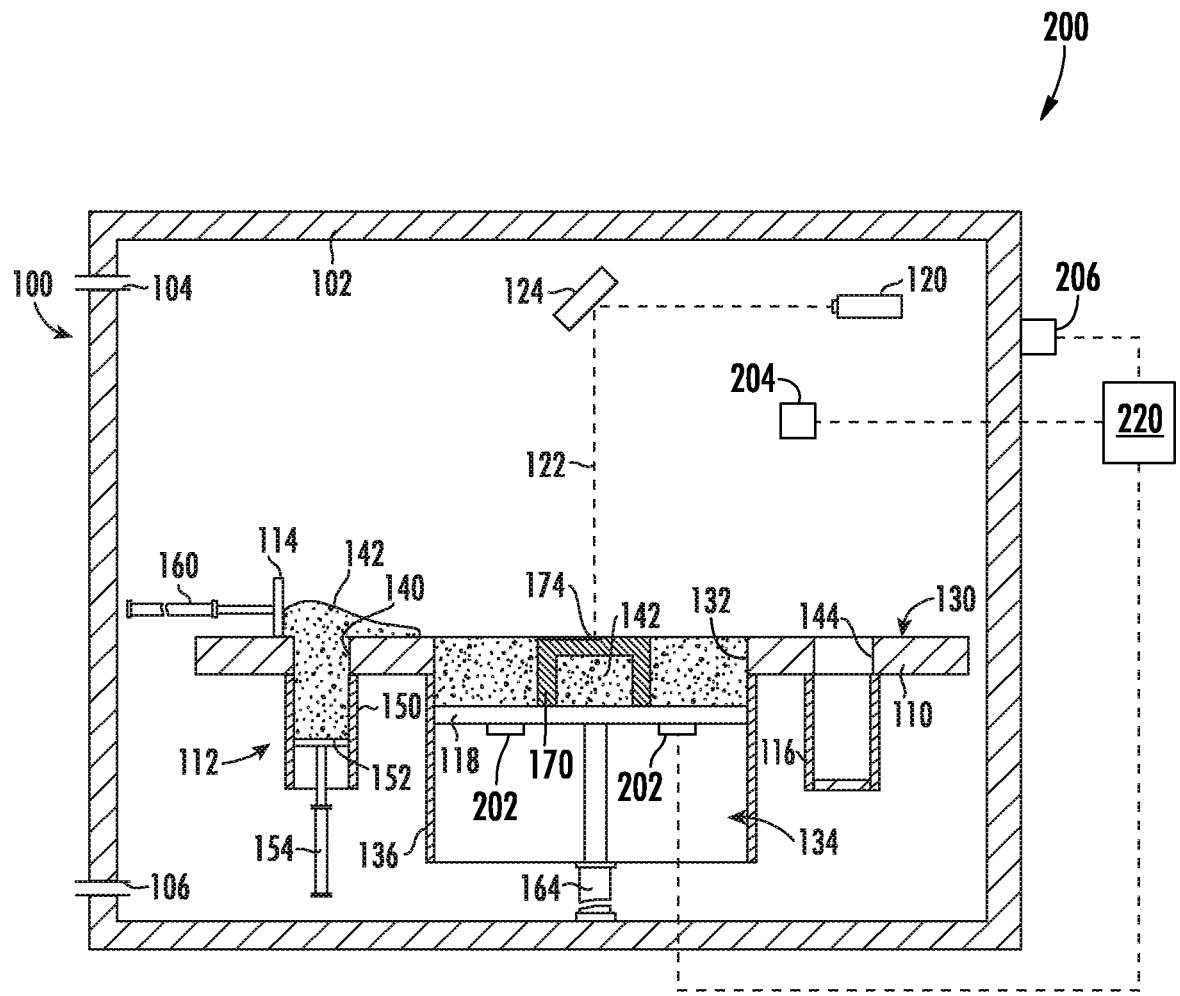
FIG. 1 shows a schematic view of an additive manufacturing machine according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. In addition, as used herein, terms of approximation, such as "approximately," "substantially," or "about," refer to being within a ten percent margin of error.

A system and method for calibrating an acoustic monitoring system of an additive manufacturing machine includes installing a calibration system on the machine and performing a calibration process. Specifically, the calibration system includes a calibration platform removably mountable to a build platform of the additive manufacturing machine and having calibrated acoustic sources mounted thereon for defining a measurement standard. The generated acoustic waves are measured by the acoustic monitoring system and compared to the known measurement standard to determine whether system adjustments would improve process tolerances or uniformity.

Referring to FIG. 1, a laser powder bed fusion system, such as a DMLS or DMLM system 100 will be described according to an exemplary embodiment. As illustrated, system 100 includes a fixed enclosure or build area 102 which provides a contaminant-free and controlled environment for performing an additive manufacturing process. In this regard, for example, enclosure 102 serves to isolate and protect the other components of the system 100. In addition, enclosure 102 may be provided with a flow of an appropriate shielding gas, such as nitrogen, argon, or another suitable gas or gas mixture. In this regard, enclosure 102 may define a gas inlet port 104 and a gas outlet port 106 for receiving a flow of gas to create a static pressurized volume or a dynamic flow of gas.

Enclosure 102 may generally contain some or all components of AM system 100. According to an exemplary embodiment, AM system 100 generally includes a table 110, a powder supply 112, a scraper or recoater mechanism 114, an overflow container or reservoir 116, and a build platform 118 positioned within enclosure 102. In addition, an energy source 120 generates an energy beam 122 and a beam steering apparatus 124 directs energy beam 122 to facilitate the AM process as described in more detail below. Each of these components will be described in more detail below.

According to the illustrated embodiment, table 110 is a rigid structure defining a planar build surface 130. In addition, planar build surface 130 defines a build opening 132 through which build chamber 134 may be accessed. More specifically, according to the illustrated embodiment, build chamber 134 is defined at least in part by vertical walls 136 and build platform 118. In addition, build surface 130 defines a supply opening 140 through which additive powder 142 may be supplied from powder supply 112 and a reservoir opening 144 through which excess additive powder 142 may pass into overflow reservoir 116. Collected additive powders may optionally be treated to sieve out loose, agglomerated particles before re-use.

Powder supply 112 generally includes an additive powder supply container 150 which generally contains a volume of additive powder 142 sufficient for some or all of the additive manufacturing process for a specific part or parts. In addition, powder supply 112 includes a supply platform 152, which is a plate-like structure that is movable along the vertical direction within powder supply container 150. More specifically, a supply actuator 154 vertically supports supply platform 152 and selectively moves it up and down during the additive manufacturing process.

AM system 100 further includes recoater mechanism 114, which is a rigid, laterally-elongated structure that lies proximate build surface 130. For example, recoater mechanism 114 may be a hard scraper, a soft squeegee, or a roller. Recoater mechanism 114 is operably coupled to a recoater actuator 160 which is operable to selectively move recoater mechanism 114 along build surface 130. In addition, a platform actuator 164 is operably coupled to build platform 118 and is generally operable for moving build platform 118 along the vertical direction during the build process. Although actuators 154, 160, and 164 are illustrated as being hydraulic actuators, it should be appreciated that any other type and configuration of actuators may be used according to alternative embodiments, such as pneumatic actuators, hydraulic actuators, ball screw linear electric actuators, or any other suitable vertical support means. Other configurations are possible and within the scope of the present subject matter.

Energy source 120 may include any known device operable to generate a beam of suitable power and other operating characteristics to melt and fuse the metallic powder during the build process. For example, energy source 120 may be a laser or any other suitable irradiation emission directing device or irradiation device. Other directed-energy sources such as electron beam guns are suitable alternatives to a laser.

According to an exemplary embodiment, beam steering apparatus 124 includes one or more mirrors, prisms, lenses, and/or electromagnets operably coupled with suitable actuators and arranged to direct and focus energy beam 122. In this regard, for example, beam steering apparatus 124 may be a galvanometer scanner that moves or scans the focal point of the laser beam 122 emitted by energy source 120 across the build surface 130 during the laser melting and sintering processes. In this regard, energy beam 122 can be focused to a desired spot size and steered to a desired position in plane coincident with build surface 130. The galvanometer scanner in powder bed fusion technologies is typically of a fixed position but the movable mirrors/lenses contained therein allow various properties of the laser beam to be controlled and adjusted. It should be appreciated that other types of energy sources 120 may be used which may use and alternative beam steering apparatus 124. For example, if the energy source 120 is an electronic control unit for directing an electron beam, beam steering apparatus 124 may be, e.g. a deflecting coil.

Prior to an additive manufacturing process, recoater actuator 160 may be lowered to provide a supply of powder 142 of a desired composition (for example, metallic, ceramic, and/or organic powder) into supply container 150. In addition, platform actuator 164 may move build platform 118 to an initial high position, e.g., such that it substantially flush or coplanar with build surface 130. Build platform 118 is then lowered below build surface 130 by a selected layer increment. The layer increment affects the speed of the additive manufacturing process and the resolution of a components or parts 170 being manufactured. As an example, the layer increment may be about 10 to 100 micrometers (0.0004 to 0.004 in.).

Additive powder is then deposited over the build platform 118 before being fused by energy source 120. Specifically, supply actuator 154 may raise supply platform 152 to push powder through supply opening 140, exposing it above build surface 130. Recoater mechanism 114 may then be moved across build surface 130 by recoater actuator 160 to spread the raised additive powder 142 horizontally over build platform 118 (e.g., at the selected layer increment or thickness). Any excess additive powder 142 drops through the reservoir opening 144 into the overflow reservoir 116 as recoater mechanism 114 passes from left to right (as shown in FIG. 1). Subsequently, recoater mechanism 114 may be moved back to a starting position. Notably, the step of recoater mechanism 114 spreading powder over build surface 130 inherently generates an acoustic wave or vibration due to friction between the recoater mechanism 114, powder layer 142, and component 170 being built. This acoustic wave travels through the build area or system enclosure 102, through the structure of the table 110, through the gas within the enclosure 102, and even outside enclosure 102.

Figure 2:
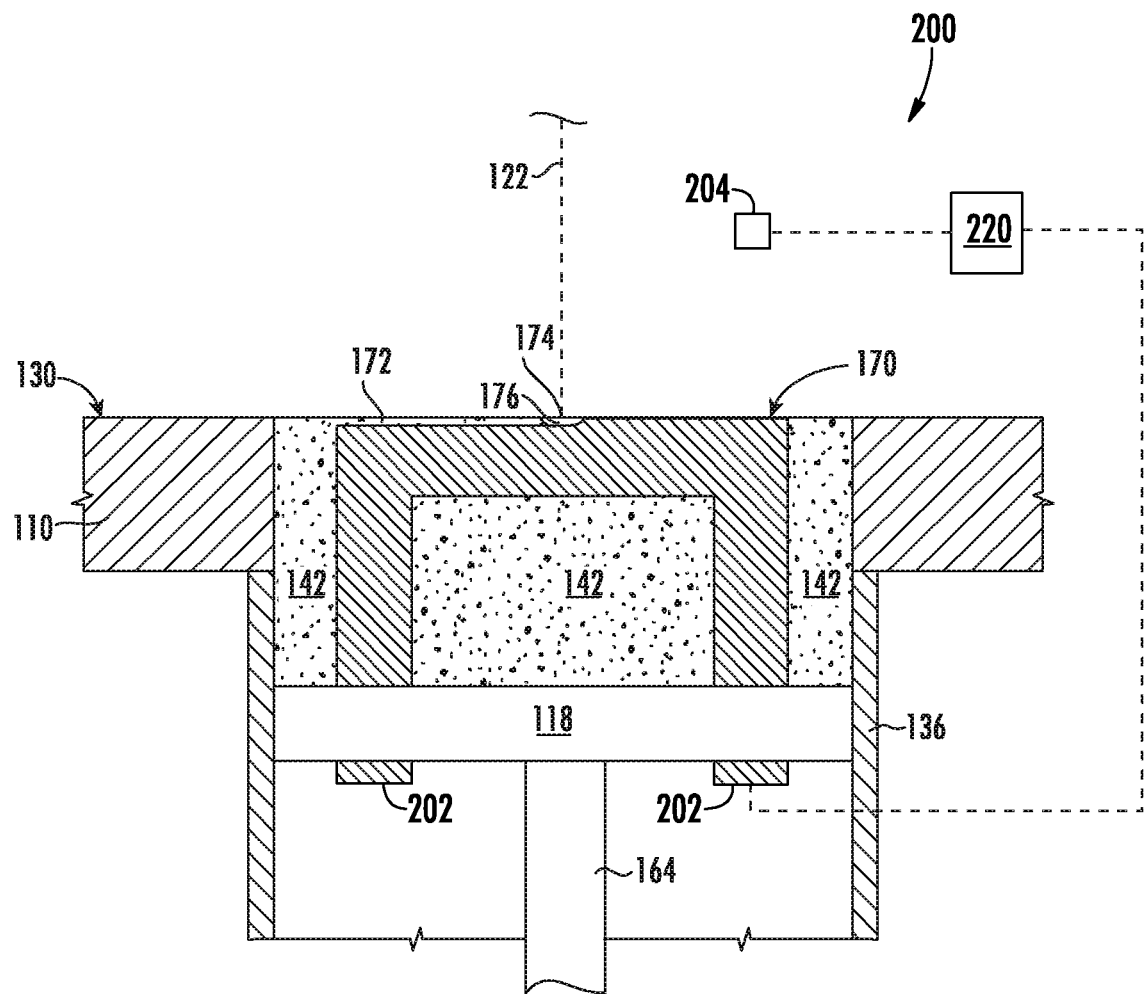
FIG. 2 shows a close-up schematic view of a build platform of the exemplary additive manufacturing machine of FIG. 1 according to an exemplary embodiment of the present subject matter.

Therefore, as explained herein and illustrated in FIG. 1, recoater mechanism 114, recoater actuator 160, supply platform 152, and supply actuator 154 may generally operate to successively deposit layers of additive powder 142 or other additive material to facilitate the print process. As such, these components may collectively be referred to herein as a powder depositing apparatus, system, or assembly. The leveled additive powder 142 may be referred to as a "build layer" 172 (see FIG. 2) and the exposed upper surface thereof may be referred to as build surface 130. When build platform 118 is lowered into build chamber 134 during a build process, build chamber 134 and build platform 118 collectively surround and support a mass of additive powder 142 along with any components 170 being built. This mass of powder is generally referred to as a "powder bed," and this specific category of additive manufacturing process may be referred to as a "powder bed process."

During the additive manufacturing process, the directed energy source 120 is used to melt a two-dimensional cross-section or layer of the component 170 being built. More specifically, energy beam 122 is emitted from energy source 120 and beam steering apparatus 124 is used to steer the focal point 174 of energy beam 122 over the exposed powder surface in an appropriate pattern. A small portion of exposed layer of the additive powder 142 surrounding focal point 174, referred to herein as a "weld pool" or "melt pool" or "heat effected zone" 176 (best seen in FIG. 2) is heated by energy beam 122 to a temperature allowing it to sinter or melt, flow, and consolidate. As an example, melt pool 176 may be on the order of 100 micrometers (0.004 in.) wide. This step may be referred to as fusing additive powder 142.

Build platform 118 is moved vertically downward by the layer increment, and another layer of additive powder 142 is applied in a similar thickness. The directed energy source 120 again emits energy beam 122 and beam steering apparatus 124 is used to steer the focal point 174 of energy beam 122 over the exposed powder surface in an appropriate pattern. The exposed layer of additive powder 142 is heated by energy beam 122 to a temperature allowing it to sinter or melt, flow, and consolidate both within the top layer and with the lower, previously-solidified layer. This cycle of moving build platform 118, applying additive powder 142, and then directed energy beam 122 to melt additive powder 142 is repeated until the entire component 170 is complete.

As explained briefly above, as energy source 120 and beam steering apparatus 124 direct energy beam 122, e.g., a laser beam or electron beam, onto the powder bed or build surface 130, the additive powders 142 are heated and begin to melt into melt pool 176 where they may fused to form the final component 170. Notably, during the step of sintering or melting additive powder, the heated material inherently generates an acoustic wave or vibration radiating out from the melt pool 176 or from focal point 174. This acoustic wave travels through the build area or system enclosure 102, through the structure of the table 110, through the gas within the enclosure 102, and even outside enclosure 102.

As described below, the acoustic waves and vibrations generated by the recoat process or by the weld pool may be detected by microphones, vibration sensors, and other devices in order to generate a measured acoustic profile. It should be appreciated that the measured acoustic profile may be recorded at any suitable predetermined interval of layer increments and using any suitable devices. Generally speaking, the measured acoustic profile may be used to improve process monitoring and control. An exemplary system for monitoring the additive manufacturing process is described below according to exemplary embodiments.

Referring still to FIG. 1, an acoustic monitoring system 200 which may be used with system 100 for monitoring melt pool 176 and the manufacturing process in general will be described according to an exemplary embodiment of the present subject matter. Acoustic monitoring system 200 includes one or more acoustic sensors or vibration sensors for measuring the acoustic waves or vibrations from the recoat process or melt pool 176. More specifically, according to the illustrated embodiment, acoustic monitoring system 200 includes one platform sensor 202, one enclosure sensor 204, and one external sensor 206. Although three sensors 202-206 are described herein, it should be appreciated that only a single sensor is needed according to exemplary embodiments. In this regard, three sensors 202-206 are described in order to illustrate various exemplary positions of such acoustic or vibration sensors, but such positioning is not intended to be limiting. Thus, it should be appreciated that acoustic monitoring system 200 may include any other suitable type, number, and configuration of sensors for detecting acoustic waves, vibrations, and other properties of melt pool 176 or the additive manufacturing process in general.

It should be appreciated that sensors 202-206 may be any sensor suitable for measuring acoustic waves or vibrations generated by melt pool 176. In addition, sensors 202-206 may be mounted at any suitable location within build enclosure 102 (e.g., platform sensor 202 or enclosure sensor 204) or outside of enclosure 102 (e.g., external sensor 206). According to exemplary embodiments, sensors 202-206 may include at least one of a microphone, a contact microphone, an acoustic wave sensor, an accelerometer, a vibration sensor, or a piezoelectric acoustic sensor. Other suitable acoustic sensors, positions, and configurations are possible and within the scope of the present subject matter.

Acoustic sensors 202-206 may be positioned within enclosure 102 or outside enclosure 102, and may be mounted to a rigid structure, suspended, or mounted in any other suitable manner. For example, FIG. 1 illustrates platform sensor 202 as being mounted to the underside of the build platform 118, enclosure sensor 204 as being suspended within enclosure 102, and external sensor 206 as being mounted to a wall of enclosure 102. In general, the process of measuring acoustic waves or vibrations using sensors 202-206 may be referred to herein as "acoustic monitoring" or the like. As used herein, the term "acoustic" refers generally to the transmission of energy through a medium such as a gas or a solid, without regard to the frequency range of such energy.

Acoustic monitoring system 200 further includes a controller 220 which is operably coupled with sensors 202-206 for receiving signals corresponding to the detected acoustic waves. Controller 220 may be a dedicated controller for acoustic monitoring system 200 or may be a system controller for operating AM system 100. Controller 220 may include one or more memory devices and one or more microprocessors, such as general or special purpose microprocessors operable to execute programming instructions or micro-control code associated with an additive manufacturing process or process monitoring. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 220 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

As explained briefly above, conventional acoustic monitoring systems are not calibrated. Moreover, when multiple additive manufacturing machines are set up for manufacturing a series of identical parts, the acoustic monitoring systems on each of these machines may have slightly different response characteristics. Therefore, aspects of the present subject matter are directed to systems and methods of calibrating acoustic monitoring systems for additive manufacturing machines.

Figure 3:
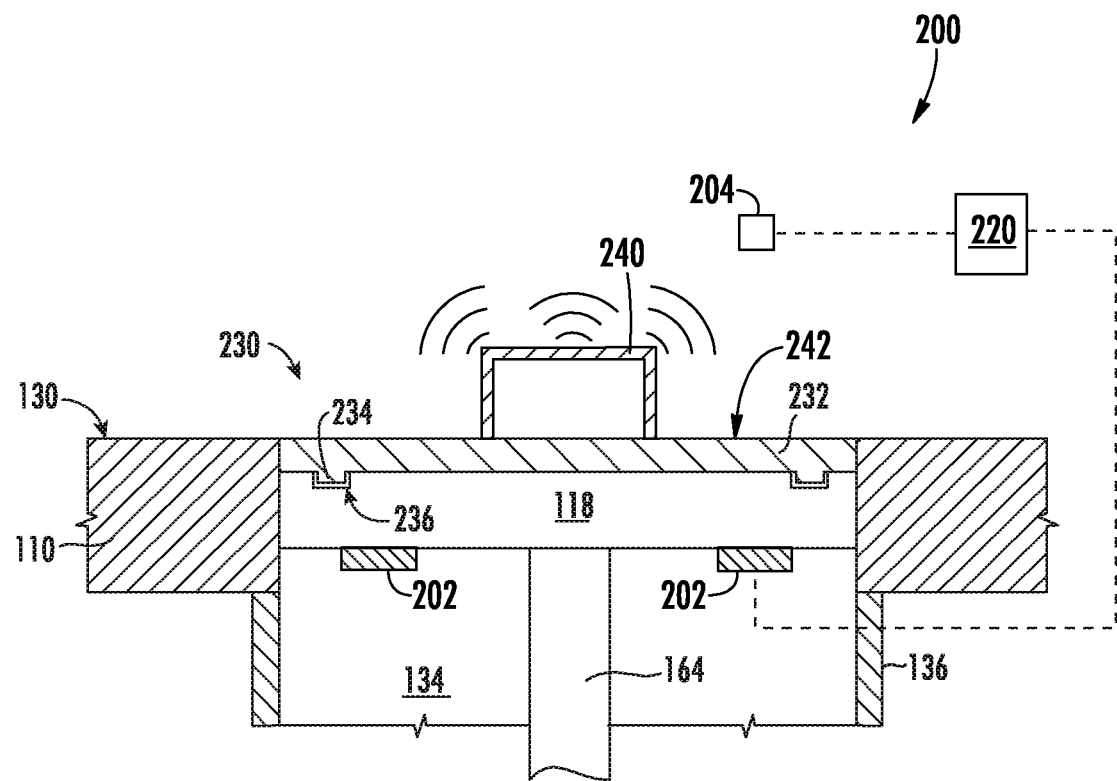
FIG. 3 shows a calibration assembly of the exemplary additive manufacturing machine of FIG. 1 according to an exemplary embodiment of the present subject matter.
Figure 4:
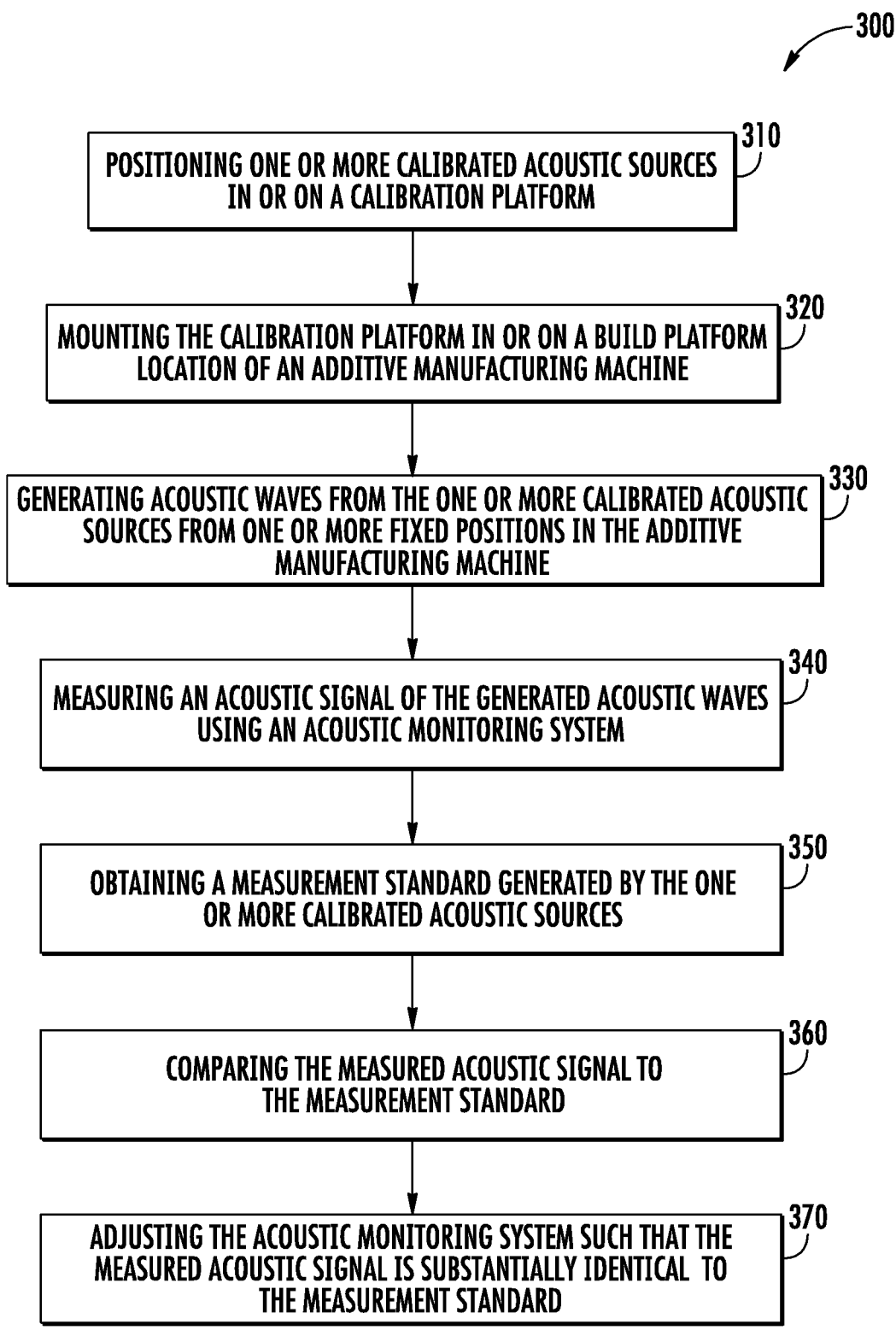
FIG. 4 is a method of calibrating an acoustic monitoring system of an additive manufacturing machine in accordance with one embodiment of the present disclosure.

Referring now specifically to FIGS. 3 and 4, a calibration system 230 which may be used to calibrate acoustic monitoring system 200 of additive manufacturing system 100 will be described according to an exemplary embodiment of the present subject matter. Although exemplary embodiments of calibration system 230 are provided herein and specifically described as being used for calibrating acoustic monitoring system 200, it should be appreciated that according to alternative embodiments, calibration system 230 may include modifications and variations, e.g., to provide more tailored calibration for a specific machine set up. The exemplary embodiments described herein and are not intended to limit the scope of the present subject matter.

As illustrated, calibration system 230 includes a calibration platform 232 which is removably mountable to build platform 118 of additive manufacturing system 100. In this regard, calibration platform 232 may be a rigid, planar mounting structure that may be mounted in any suitable additive manufacturing machine such that the position of calibration platform 232 is in a known position relative to the acoustic monitoring system 200. For example, calibration platform 232 may have the same dimensions as build platform 118 (e.g., in a horizontal plane defined by the build surface 130). In this manner, by positioning the calibration platform 232 through build opening 132, vertical walls 136 may ensure that calibration platform 232 is repeatedly positioned in a fixed, known location and orientation.

According to the exemplary embodiment, calibration platform 232 defines one or more alignment features 234 that are configured for engaging complementary features 236 defined on build platform 118 or on a build platform location of the AM machine 100. More specifically, for example, alignment features 234 may be bolts that extend down from calibration platform 232 toward build platform 118 and complementary features 236 may be holes defined in build platform 118 for receiving the bolts. Notably, each additive manufacturing machine may include an identical build platform 118 having identical complementary features 236 for receipt of alignment features 234. In this manner, build platform 118 may be moved from machine to machine by having a fixed relative position that may be known by controller 220 to achieve a precise and improved calibration process.

In addition, calibration system 230 includes one or more calibrated acoustic sources 240 that are mounted to calibration platform 232 at a fixed, known position. Calibrated acoustic sources 240 are generally configured for defining a measurement standard (such as an acoustic calibration standard) when energized or otherwise operating. In this regard, for example, calibrated acoustic sources 240 may generate acoustic waves or vibrational energy having a known signal amplitude, signal intensity, signal frequency, signal frequency spectrum, or any other suitable measurable quantity or quality of acoustic energy. It should be appreciated that as used herein, "measurement standard" may be used interchangeably to refer to the actual acoustic waves or energy generated by calibrated acoustic sources 240 or the signal generated by acoustic monitoring system 200 when measuring those acoustic waves.

Vibrations due to recoat process are typically in the audible range, 20 Hz to 20 kHz with the measured amplitude of the vibration depending largely on the placement of the sensors 202-206 of acoustic monitoring system 200. Recoater contact with the component 170 or increased friction due to distortion of the component 170 or any other effect that reduces the effective powder layer thickness during the recoat process will result in an increase in amplitude and frequency of the vibration. Acoustic noise generated by the melt pool formation is typically in the audible range as well, 20 Hz to 20 kHz, while further vibrations may be generated in the ultrasonic range, 20 kHz to 50 Mhz, by residual stresses resulting in crack, porosity, or other mechanical defect formation. Specific measured frequencies and amplitudes will also depend on the nature of the sensor used and attenuation of the signal as it travels from source to sensor.

In general, calibrated acoustic sources 240 may be any source of acoustic waves or vibrational energy, such as a speaker, a sound generating device, a vibration mechanism, a piezoelectric generator, or an acoustic wave generator, or any other device which generates sound waves having a known and measurable quantity or quality of acoustic emissions, e.g., as described above. The terms "acoustic source," "vibration source," and the like may be used interchangeably herein.

According to the illustrated embodiment, calibration system 230 includes a single calibrated acoustic source 240 mounted at a center of calibration platform 232. In this regard, calibration system 230 may include a mounting structure 242 which may include one or more struts, slats, or other supports to hold calibrated acoustic source 240 in its fixed position. Although a single calibrated acoustic source 240 is illustrated in the exemplary embodiments, it should be appreciated that according to alternative embodiments any suitable number, type, and positioning of calibrated acoustic sources 240 may be used to enable calibration of multiple sensors associated respectively with multiple laser systems and/or to account of normal spatial variation in the sensor response due to acoustic system design. For example, according to another embodiment, calibration system 230 includes four calibrated acoustic sources 240 spaced equidistant from each other on calibration platform 232 (e.g. proximate each of the four corners of calibration platform 232).

In addition, calibrated acoustic sources 240 may be positioned at a fixed location within AM system 100 using any other suitable device or mechanism, which may be referred to herein as an acoustic mounting mechanism. For example, according to another exemplary embodiment, one or more calibrated acoustic sources 240 may be mounted to a retractable arm (not shown) mounted on a side of build chamber 134. In this manner, prior to a manufacturing process, the retractable arm could extend to position the acoustic source 240 in the desired position, the calibration process could be performed, and the arm could be retracted before starting the build.

According to still other embodiments, the location of calibrated acoustic sources 240 may be adjusted by at least one of computer controls (e.g., via controller 220), using an alignment motor, based in response to a position determined by an alignment sensor, etc. Alternatively, one or more calibrated acoustic sources 240 may be positioned elsewhere within enclosure 102 or even outside of enclosure 120, so long as the output of such acoustic sources 240 is measurable by acoustic monitoring system 200, e.g., via sensors 202-206. Other suitable mounting structures and solutions are possible and within the scope of the present subject matter.

Notably, according to an exemplary embodiment, calibration system 230 may be movable among multiple additive manufacturing machines to provide consistent calibration values across all machines. As used herein, "calibration" may be used generally refer to the process of comparing a measured value from a sensor to a known value or calibration signal standard. In this regard, for example, calibration system 230 may generate a known "measurement standard" that may be measured by one or more acoustic sensors, such as sensors 202-206 of acoustic monitoring system 200. The sensor parameters may be adjusted until the output of the sensor is indicative of measured acoustic waves or vibrations that are substantially equivalent to the measurement standard. Alternatively, controller 220 may be configured to compensate for differences between the measured acoustic waves and the measurement standard. In this manner, a relationship between a known value (the measurement standard) and an unknown value (the measured acoustic waves) may be used to adjust the sensor output and reduce measurement uncertainty.

By adjusting all acoustic monitoring systems 200 in a group of additive manufacturing machines based on their response to the acoustic waves generated by the calibration system 230 (i.e., the measurement standard), subsequent measurements obtained during the additive manufacturing of parts may be reliable indicators of the process and melt pool characteristics. Controller 220 may be configured for receiving, manipulating, and using this information to make necessary process corrections to achieve more precision by a single machine and more uniformity among a group of machines which have been similarly calibrated.

It should be appreciated that AM system 100, acoustic monitoring system 200, and calibration system 230 are illustrated and described herein only for explaining aspects of the present subject matter. However, the scope of the present subject matter is not limited to such exemplary embodiments, but is instead contemplated as including embodiments including variations and modifications. For example, although the actuators are illustrated herein as being a hydraulic actuators, other suitable types and configurations of actuators may be used according to alternative embodiments. In addition, other suitable forms and/or types of powder supply 112 may be used, such as a powder container that moves along build surface 130 while depositing additive powder at a predetermined flow rate. Furthermore, any suitable configuration of beam steering apparatus 124 may be used, e.g., based on the type of energy beam 122 generated. Other configurations are possible and within the scope of the present subject matter.

Now that the construction and configuration of AM system 100, acoustic monitoring system 200, and calibration system 230 have been described according to exemplary embodiments of the present subject matter, an exemplary method 300 for calibrating process monitoring system of an additive manufacturing system will be described according to an exemplary embodiment of the present subject matter. Method 300 can be used to calibrate acoustic monitoring system 200 of AM system 100, or any other suitable additive manufacturing machine. In this regard, for example, controller 220 may be configured for implementing some or all steps of method 300. Further, it should be appreciated that the exemplary method 300 is discussed herein only to describe exemplary aspects of the present subject matter, and is not intended to be limiting.

Referring now to FIG. 4, method 300 includes, at step 310, positioning one or more calibrated acoustic sources in or on a calibration platform. In this regard, continuing the example from above, calibrated acoustic source 240 may be mounted on calibration platform 232 at a known location. Although the figures illustrate a single calibrated acoustic source 240 positioned in the center of calibration platform 232, it should be appreciated that any suitable number, type, spacing, and configuration of acoustic sources can be used according to alternative embodiments. Step 220 includes mounting the calibration platform in or on a build platform location of an additive manufacturing machine. For example, calibration platform 232 may be mounted to build platform 118 and may be aligned and oriented by vertical walls 136 and/or by the seating of alignment features 234 within complementary features 236 defined by build platform 118. In this manner, the position of calibrated acoustic source 240 is in a known location and orientation within a three-dimensional space within enclosure 102. According to alternative embodiments, calibrated acoustic source 240 could be positioned at any other suitable location within or outside of enclosure 102.

Step 330 includes generating acoustic waves from the one or more calibrated acoustic sources from one or more fixed positions in the additive manufacturing machine. In this regard, for example, calibrated acoustic source 240 may be energized or otherwise operated to generate noise, acoustic waves, or vibrational energy that may be measured by acoustic monitoring system 200, e.g., using sensors 202-206. Notably, as explained above, when calibrated acoustic source 240 is operated, the acoustic waves generated define a measurement standard having a known signal amplitude, signal intensity, frequency, frequency response, etc.

Step 340 includes measuring and acoustic signal of the generated acoustic waves using an acoustic monitoring system. In this regard, acoustic monitoring system 200 uses one or more of sensors 202-206 to measure the acoustic waves or vibrational energy generated by calibrated acoustic source 240. Steps 350 and 360 are generally directed toward comparing the measured acoustic signal to a known standard to determine the accuracy/calibration of the acoustic sensor.

Specifically, step 350 includes obtaining a measurement standard generated by the one or more calibrated acoustic sources. This measurement standard may be provided by a manufacturer of the acoustic source, may be determined by syncing up the output of the acoustic source with a known and reliable acoustic source, or may be determined in any other suitable manner. Step 360 includes comparing the measured acoustic signal to the measurement standard. Notably, if sensors 202-206 are properly calibrated, the acoustic signal which is measured should be substantially equivalent to the measurement standard of calibrated acoustic source 240. By contrast, if there is a difference between the acoustic signal and the measurement standard, a calibration procedure may be desirable to ensure improved process monitoring.

Step 370 includes adjusting the acoustic monitoring system such that the measured acoustic signal is substantially identical to the measurement standard. As described above, such an adjustment may be made by adjusting a physical gain of one or more of sensors 202-206 or making an electronic compensation or adjustment of the measured signals (e.g., using controller 220). Alternatively, it may be determined that a sensor must be replaced entirely or that a maintenance procedure should be performed.

FIG. 4 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using AM system 100, acoustic monitoring system 200, and calibration system 230 as an example, it should be appreciated that these methods may be applied to the calibration and operation of any suitable monitoring system of any suitable additive manufacturing machine.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of calibrating an acoustic monitoring system of an additive manufacturing machine, the method comprising:
    generating acoustic waves from one or more calibrated acoustic sources from one or more known positions in the additive manufacturing machine;
    measuring an acoustic signal of the generated acoustic waves using the acoustic monitoring system;
    comparing the measured acoustic signal to a measurement standard for use in calibrating the acoustic monitoring system;
    positioning the one or more calibrated acoustic sources in or on a calibration platform; and
    removably mounting the calibration platform in or on a build platform location of the additive manufacturing machine.

2. The method of claim 1, wherein mounting the calibration platform in or on the build platform location comprises:
    aligning one or more alignment features defined on the calibration platform with complementary features defined on the build platform location of the additive manufacturing machine.

3. The method of claim 1, further comprising:
    obtaining the measurement standard generated by the one or more calibrated acoustic sources from a manufacturer of the one or more calibrated acoustic sources.

4. The method of claim 1, wherein comparing the measured acoustic signal to the measurement standard comprises comparing values for one or more of signal amplitude, signal frequency, signal intensity, signal volume, sensor voltage or current response, and sensor noise response.

5. The method of claim 1, further comprising:
    adjusting the acoustic monitoring system such that the measured acoustic signal is substantially identical to the measurement standard.

6. The method of claim 5, wherein adjusting the acoustic monitoring system such that the measured acoustic signal is substantially identical to the measurement standard comprises adjusting one or more of a physical gain of the acoustic monitoring system, an electronic adjustment of the measured acoustic signal, performing corrective maintenance, or replacing a sensor.

7. The method of claim 1, wherein measuring the acoustic signal using the acoustic monitoring system comprises using at least one of a microphone, a contact microphone, an acoustic wave sensor, an accelerometer, a vibration sensor, and a piezoelectric acoustic sensor.

8. The method of claim 1, wherein the one or more calibrated acoustic sources generate acoustic waves having a known signal amplitude, signal intensity, signal frequency, or signal frequency spectrum.

9. The method of claim 1, wherein a mounting location of the calibrated acoustic sources is adjusted by at least one of computer controls, an alignment motor, and an alignment sensor.

10. The method of claim 1, wherein at least one of the calibrated acoustic sources is mounted outside of a build area of the additive manufacturing machine.

11. A calibration system for an acoustic monitoring system of an additive manufacturing machine, the calibration system comprising:
a mounting mechanism positionable at desired locations within the additive manufacturing machine; and
one or more calibrated acoustic sources mounted to the mounting mechanism, the one or more calibrated acoustic sources defining a measurement standard when operating,
wherein a mounting location of the calibrated acoustic sources is adjusted by at least one of computer controls, an alignment motor, and an alignment sensor.

12. The calibration system of claim 11, wherein the mounting mechanism comprises a calibration platform removably mountable to a build platform of the additive manufacturing machine.

13. The calibration system of claim 12, wherein the calibration platform defines one or more alignment features that are configured for engaging complementary features defined on the build platform.

14. The calibration system of claim 11, wherein the one or more calibrated acoustic sources are selected from a group consisting of a speaker, a sound generating device, a vibration mechanism, a piezoelectric generator, and an acoustic wave generator.

15. The calibration system of claim 11, wherein the one or more calibrated acoustic sources generate acoustic waves having a known signal amplitude, signal intensity, signal frequency, or signal frequency spectrum.

16. The calibration system of claim 11, wherein the acoustic monitoring system comprises at least one of a microphone, a contact microphone, an acoustic wave sensor, an accelerometer, a vibration sensor, and a piezoelectric acoustic sensor.

17. The calibration system of claim 11, wherein at least one of the calibrated acoustic sources is mounted in contact with a build platform of the additive manufacturing machine.

18. The calibration system of claim 11, wherein at least one of the calibrated acoustic sources is mounted outside of a build area of the additive manufacturing machine.

* * * * *